Sept. 23, 1924.
D. SCHWARTZ
PLATE FOR STOVES
Filed March 27, 1924
1,509,445
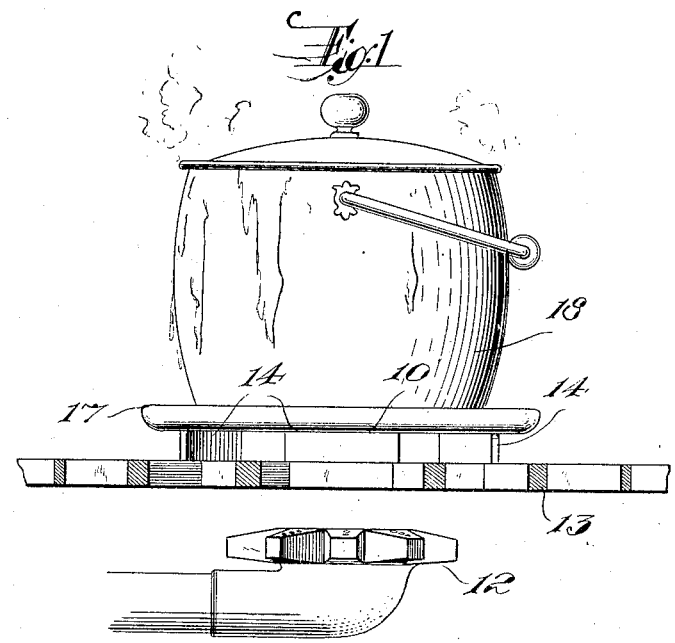
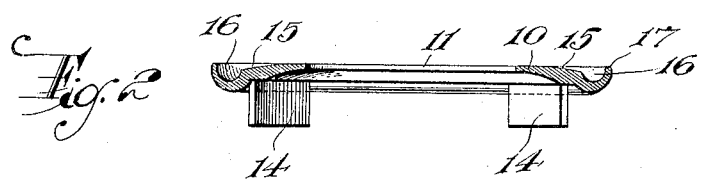
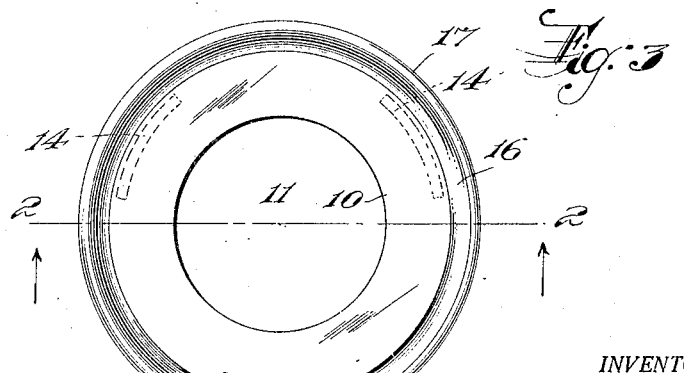
INVENTOR.
David Schwartz
BY
ATTORNEYS.

Patented Sept. 23, 1924.

1,509,445

UNITED STATES PATENT OFFICE.

DAVID SCHWARTZ, OF NEWARK, NEW JERSEY.

PLATE FOR STOVES.

Application filed March 27, 1924. Serial No. 702,418.

*To all whom it may concern:*

Be it known that I, DAVID SCHWARTZ, a citizen of the United States, and a resident of Newark, county of Essex and State of New Jersey, have invented certain new and useful Improvements in Plates for Stoves, of which the following is a specification.

This invention relates to an improved plate for stoves and supports the cooking utensil above the usual open work or frame that is arranged above the burner in the conventional gas or oil stove and is designed to support the cooking utensil so that it receives the major portion of the heat from the burner but lessens the chance of the contents being burned by such slight elevation above the normal plate on the stove.

The plate is also used in order to keep the stove clean and also to make its operation safer because in oil stoves when the liquid boils over and is deposited on the burner the result is a severe flash of flame which extends sometimes six or eight feet above the stove, and in gas stoves if it boils over without anyone watching it, it oftens extinguishes the light and thus renders persons in the vicinity subject to asphyxiation from the escaping of gas.

In my improved plate any material that boils over and runs or drips down the sides of the utensil is held by the plate and the accumulation of the material on the plate is cut down since the plate is hot and the liquid is evaporated rapidly.

The invention is illustrated in the accompanying drawing in which Figure 1 is a side view of the plate supported on the open work top plate of a gas stove and is illustrated as holding a cooking pot. Figure 2 is a vertical section on line 2—2 in Figure 3 and Figure 3 is a top view of the plate.

The plate consists of an annular ring 10, the opening 11 in the center of it being sufficiently large to support a utensil and to leave the major portion of the bottom surface of the utensil open to the flame from the burner 12.

The plate can be supported directly on the top plate 13 of the stove above the burner but I prefer to elevate it slightly and for this purpose I place the separated feet 14 on the bottom of the plate, these feet being provided with flat bottom faces and usually curved so that they bridge the openings in the grill of the top plate 13 of the stove.

The ring 10 is substantially flat but the top face is preferably inclined as at 15, this inclination being toward the trough 16 which in the form shown, is around the outer edge of the plate. The outer wall 17 is sufficiently high to prevent liquid flowing down the slope 15 from running up over this outside edge. It will be evident that when the cooking utensil 18 has any of its liquid contents boil over, these contents will flow down the outside of the utensil and be deposited on the upper face of the ring 10 and then will be directed into the trough 16 which extends around the ring and takes care of this surplus liquid and thus prevents it from flowing onto the burner 12.

The plate is usually made of cast metal and is of such form that it can be cheaply manufactured and provides a substantially flat structure and takes up but little room when stowed away and not in use.

It will be evident that the plate with the groove around the edge of it to contain and evaporate overflowing liquid can be permanently attached to the utensil and thus made into a unitary structure although the form shown is preferred.

I claim:

A plate for stoves comprising a one-piece flat ring having a trough extending around its outer edge, the plate having feet on its bottom face, said feet being formed as curved bands with flat lower faces so as to insure the plate resting level on the grill of a stove.

In testimony that I claim the foregoing, I have hereto set my hand, this 13th day of March, 1924.

DAVID SCHWARTZ.